United States Patent Office 3,006,902
Patented Oct. 31, 1961

3,006,902
VINYLIDENE CHLORIDE, VINYL CHLORIDE HIGHER ALKYL ACRYLATE TERPOLYMERS
Alexei Trofimow, 56 Boylston St., Cambridge, Mass.; Philip K. Isaacs, 186 Mason Terrace, Brookline, Mass.; and Donald Goodman, 5 Leland Road, Brookline, Mass.
No Drawing. Filed Jan. 12, 1959, Ser. No. 786,000
5 Claims. (Cl. 260—80.5)

This invention relates to terpolymers of vinylidene chloride, vinyl chloride and higher alkyl acrylates.

It has previously been proposed to prepare terpolymers from vinylidene chloride, vinyl chloride and an alkyl acrylate, e.g. 2-ethylhexyl acrylate. However, such terpolymers have been found lacking in one or more properties essential for films suitable for making clear heat shrinking and heat sealable packages for food items and having a high tensile strength, excellent cold flexibility, good room temperature stiffness and low tack.

It is an object of the present invention to prepare new terpolymers of vinylidene chloride, vinyl chloride and an alkyl acrylate having 8 to 18 carbon atoms in the alkyl group.

It is another object to prepare such terpolymers which can be converted into films having high clarity and high tensile strength.

A further object is to prepare such terpolymers which can be converted into films having perfect heat sealability and satisfactory heat shrinking properties.

An additional object is to prepare such terpolymers which can be converted into films having excellent low temperature properties including cold flexibility as well as good room temperature stiffness.

Yet another object is to prepare vinylidene chloride resins which can be extruded into films and which require the use of little if any plasticizer.

A still further object is to produce a vinylidene chloride terpolymer having a high content of chloride for minimum vapor and gas permeability.

Another object is to provide an internally plasticized vinylidene chloride terpolymer which requires less external plasticizer, retains its flexibility at low temperatures, is compatible with conventional external plasticizers for vinylidene chloride resins, which does not exude plasticizer on long storage, does not give off taste or odor and which has a low tack.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing certain specific terpolymers of vinylidene chloride and an alkyl acrylate having 8 to 18 carbon atoms in the alkyl group. It is critical that the monomers be employed in the following proportions: (All percentages and proportions throughout the specification and claims are by weight unless otherwise indicated.)

|  | Range, percent | Preferred |
|---|---|---|
| Vinylidene chloride | 75–80 | 80 |
| Vinyl chloride | 15–20 | 15 |
| Alkyl acrylate | 5–10 | 5 |

The preferred alkyl acrylate is 2-ethylhexyl acrylate although there can also be employed other alkyl acrylates having 8 to 18 carbon atoms in the alkyl group such as n-octyl acrylate, n-octadecyl acrylate, n-decyl acrylate, lauryl acrylate, 3,5,5-trimethylhexyl acrylate. The proportions recited are critical since the requisite properties for an outstandingly satisfactory extrudable product are not obtained with other proportions of the 3 monomers.

Utilizing the reaction conditions of the present invention it has been found that the terpolymers formed can be easily extruded into a packaging film having improved properties. The extrusion can be accomplished utilizing the procedure described in Stephenson Patent 2,452,080. The product is generally stretched longitudinally 100 to 300% and laterally 100 to 300%.

The order in which the acrylate, vinylidene chloride and vinyl chloride are added to the reaction vessel is also important. The best physical properties of the final product are obtained by adding the acrylate first into the system. Preferably the acrylate is added 5 to 10 minutes before adding the mixture of vinylidene chloride and vinyl chloride. By adding the acrylate first not only are the tensile strength and low temperature properties of the resulting film the best but in addition there is a marked superiority in heat shrinkability. In one instance the shrink at 205° F. was increased from 35% to 46% simply by adding the alkyl acrylate before adding the vinylidene chloride and vinyl chloride.

The polymerization is carried out at a temperature between 20 and 40° C. and at a pH of 2.0 to 3.0 and is continued until 80–90%, preferably 85% of the total monomers are converted to terpolymer. Any of the conventional peroxides, persulfates or azo compounds can be utilized as catalysts. Among the suitable catalysts may be mentioned potassium persulfate, sodium persulfate, hydrogen peroxide, peracetic acid, benzoyl peroxide, azo-bis-isobutyronitrile, cumene hydroperoxide, tertiary butyl perbenzoate, redox catalyst such as a combination of any of the peroxygen catalysts mentioned above together with reducing agents such as sodium sulfite, sucrose, ferrous gluconate, etc.

The polymerization is carried out in aqueous emulsion. The preferred emulsifiers have at least 18 carbon atoms in a single alkyl or alkaryl group. Among such emulsifiers there may be mentioned dodecyl benzene sodium sulfonate, octadecyl benzene sodium sulfonate, sodium and potassium salts of octadecane-1-sulfonic acid, sodium salts of sulfonated paraffin oils having at least 18 carbon atoms in the paraffin chain, etc. These emulsifiers are used in an amount of 0.1 to 3.0%. The preferred emulsifiers have the advantage of low cost, freedom from taste and acceptability in food packaging materials and can be in much lower concentrations than the standard emulsifying agents employed commercially today in preparing vinylidene chloride copolymers.

It has been observed that 5% of copolymerized acrylate in the terpolymer of the present invention behaves like 2% of external plasticizer. As a consequence less external plasticizer is required and in some instances it can be omitted completely.

EXAMPLE 1

| Aqueous phase: | Parts |
|---|---|
| Demineralized water | 160 |
| Potassium persulfate | 0.08 |
| Sodium bisulfite | 0.04 |
| Nitric acid | 0.04 |
| Dodecyl benzene sodium sulfonate (Ultrawet K) | 0.5 |
| Glycerine | 0.5 |
| Ferric nitrate (3 p.p.m.) | 0.00048 |

Monomers:
 Vinylidene chloride_____ 80
 Vinyl chloride_____ 15
 2-ethylhexyl acrylate_____ 5

The aqueous phase was loaded into a glass-lined pressure reactor and deaerated. Inhibitor free 2-ethylhexyl acrylate was then added. After 10 minutes the mixture of vinylidene chloride and vinyl chloride was pressured into the reactor by nitrogen and the system was heated to 30° C. The polymerization was then allowed to proceed under the following conditions:

Temperature_____ 30±0.5° C.
Stirring rate_____ 175 to 200 r.p.m.
Reaction rate_____ 5 to 7% solids formed per hour.

The pressure rose during the reaction from 14 p.s.i. to 30 p.s.i. and then dropped gradually to 20 p.s.i. The reaction was allowed to proceed until the overall conversion was 85%, corresponding to 33 to 35%. The reactor was vented, cooled to 20° C. and subjected to a 26 inch vacuum for 45 minutes to strip off the unreacted monomers. The resultant later was coagulated with 2 parts of a 0.1% aluminum sulfate solution. The slurry heated to 60° C. for ½ hour and then the mixture was centrifuged and washed with water to remove emulsifier and catalyst. The crumbs were dried at 70° C. for 18 hours.

EXAMPLE 2

Example 1 was repeated except that a mixture of the vinylidene chloride, vinyl chloride and 2-ethylhexyl acrylate was added to the reactor rather than adding the acrylate separately.

EXAMPLE 3

This example was identical with Example 2 except that the monomer ratio was changed to 75% vinylidene chloride, 20% vinyl chloride and 5% 2-ethylhexyl acrylate.

The terpolymers of the present invention have a bulk density of 0.35 to 0.45, melting range of 115–140° C., no odor, no taste, are clear slightly yellowish in the molten platen test and have about 68% chlorine and bound vinylidene chloride of 80% (except for Example 3 wherein the bound vinylidene chloride is 75%).

The advantages of the products of the present invention over those produced by prior art methods are illustrated in the table where properties of the extruded films are listed. All of the polymers tested were blended with 7% dibutyl sebacate as a plasticizer and 0.3% of tetrasodium pyrophosphate as a stabilizer and extruded into biaxially oriented film in the manner described in Stephenson Patent 2,452,080. The extrusion procedure employed was that described in connection with FIGURE 1 of Stephenson.

Specifically, the polymer containing the dibutyl sebacate and tetrasodium pyrophosphate was extruded at a temperature of 160° C. through a circular die orifice having an outside diameter of 2.5 inches and an internal diameter of 2.38 inches. The tube 1, while still hot, was conducted into a bath of water maintained at 15° C. in order to supercool the polymer. A quantity of propylene glycol having a specific gravity of 1.0375–1.0400 at 20° C. was maintained inside the tube by a first set of pinch rolls so that its surface was ¼ inch above that of the water bath. The polymer was extruded at a rate of 12 lbs./hr. The supercooled tube was passed through a hot water bath at 45° C. and then passed between a second pair of pinch rolls rotating at a peripheral speed of 8 ft./min. and subsequently between a third pair of pinch rolls (deflate rolls) rotating at a peripheral speed of 28 ft./min. Compressed air was introduced into the section of the tube lying between the second and third set of pinch rolls until a portion of the section was distended with the formation of a bubble of diameter larger than the diameter of the supercooled tube and the introduction of further air resulted only in the elongation of the bubble and not in any further increase in its diameter. The biaxially stretched and flattened tube which issued from between the second pair of pinch rolls was passed over a series of smoothing rolls and wound on a drum. The supercooled tube after passing through the second set of pinch rolls, had a diameter of 1½ inches and a wall thickness of about 18–20 mils. After cold-stretching, the tube had a diameter of about 5–8 inches and a wall thickness of about .8–1 mil.

In the table the first polymer was a one step emulsion copolymer of 70% vinylidene chloride and 30% vinyl chloride which was commercially used in the process of the Stephenson patent to prepare a heat shrinking biaxially oriented copolymer.

The products of the present invention, and in particular those of Example 1, were outstandingly suitable as packaging films for food products, e.g., frozen meat or the like.

*Table of film properties*

| Polymer | Commercial copolymer | Ex. 1 | Ex. 2 | Ex. 3 |
|---|---|---|---|---|
| Vinylidene chloride content, percent | 70 | 80 | 80 | 75 |
| Tensile strength, 1,000 p.s.i. | 8–10 | 17 | 16 | 10–11 |
| Modulus, 1,000 p.s.i. at 74° F | 16–20 | 25–27 | 22–25 | 12–15 |
| Modulus, 1,000 p.s.i. at 10° F | 350–450 | 180–200 | 200–220 | 115–130 |
| Clarity: | | | | |
| Haze, percent | 6–13 | 3 | 3 | 3–4 |
| Diffuse reflectivity, percent | 1–3 | 1.0 | 1.0 | 1.0 |
| Shrink at 205° F., percent | 55–60 | 40–42 | 30–35 | 50–53 |
| 7 day outside tack, cgms | 3,500 | 1,500–2,000 | 200–500 | 2,500 |
| Heat seal | Good | Good | Good | Fair |

What is claimed:

1. A biaxially oriented heat shrinkable terpolymer of 75–80% vinylidene chloride, 15–20% vinyl chloride and 5–10% of an alkyl acrylate having 8 to 18 carbon atoms in the alkyl group said terpolymer having been prepared by polymerizing said alkyl acrylate in an aqueous emulsion in the presence of a catalyst selected from the group consisting of peroxy compounds and azo compounds, 5 to 10 minutes after initiating the polymerization of said alkyl acrylate adding said vinylidene chloride and said vinyl chloride and continuing the polymerization, said polymerization being carried out at 20–40° C. at a pH of 2.0–3.0 and stopping the polymerization when 80–90% of the total monomers are converted to terpolymer, and thereafter biaxially stretching the terpolymer.

2. A process of preparing a terpolymer of 75–80% vinylidene chloride, 15–20% vinyl chloride and 5–10% of an alkyl acrylate having 8 to 18 carbon atoms in the alkyl group, said process comprising polymerizing said alkyl acrylate in an aqueous emulsion in the presence of a catalyst selected from the group consisting of peroxy compounds and azo compounds, 5 to 10 minutes after initiating the polymerization of said alkyl acrylate adding said vinylidene chloride and said vinyl chloride and continuing the polymerization, said polymerization being carried out at 20–40° C. at a pH of 2.0–3.0 and stopping the polymerization when 80–90% of the total monomers are converted to terpolymer.

3. A process according to claim 2 wherein a member of the group consisting of alkyl sulfonates and alkaryl sulfonates having at least 18 carbon atoms is employed as an emulsifying agent.

4. A process according to claim 2 wherein the alkyl acrylate is 2-ethylhexyl acrylate.

5. A process according to claim 4 wherein a member of the group consisting of alkyl sulfonates and alkaryl sulfonates having at least 18 carbon atoms is employed as an emulsifying agent.

References Cited in the file of this patent

UNITED STATES PATENTS

| | | |
|---|---|---|
| 2,651,626 | De Nie | Sept. 8, 1953 |
| 2,713,568 | Fisher et al. | July 19, 1955 |
| 2,769,803 | Becker | Nov. 6, 1956 |